(No Model.) 3 Sheets—Sheet 1.
J. VAN SICLEN.
FERTILIZER DISTRIBUTER.
No. 347,535. Patented Aug. 17, 1886.
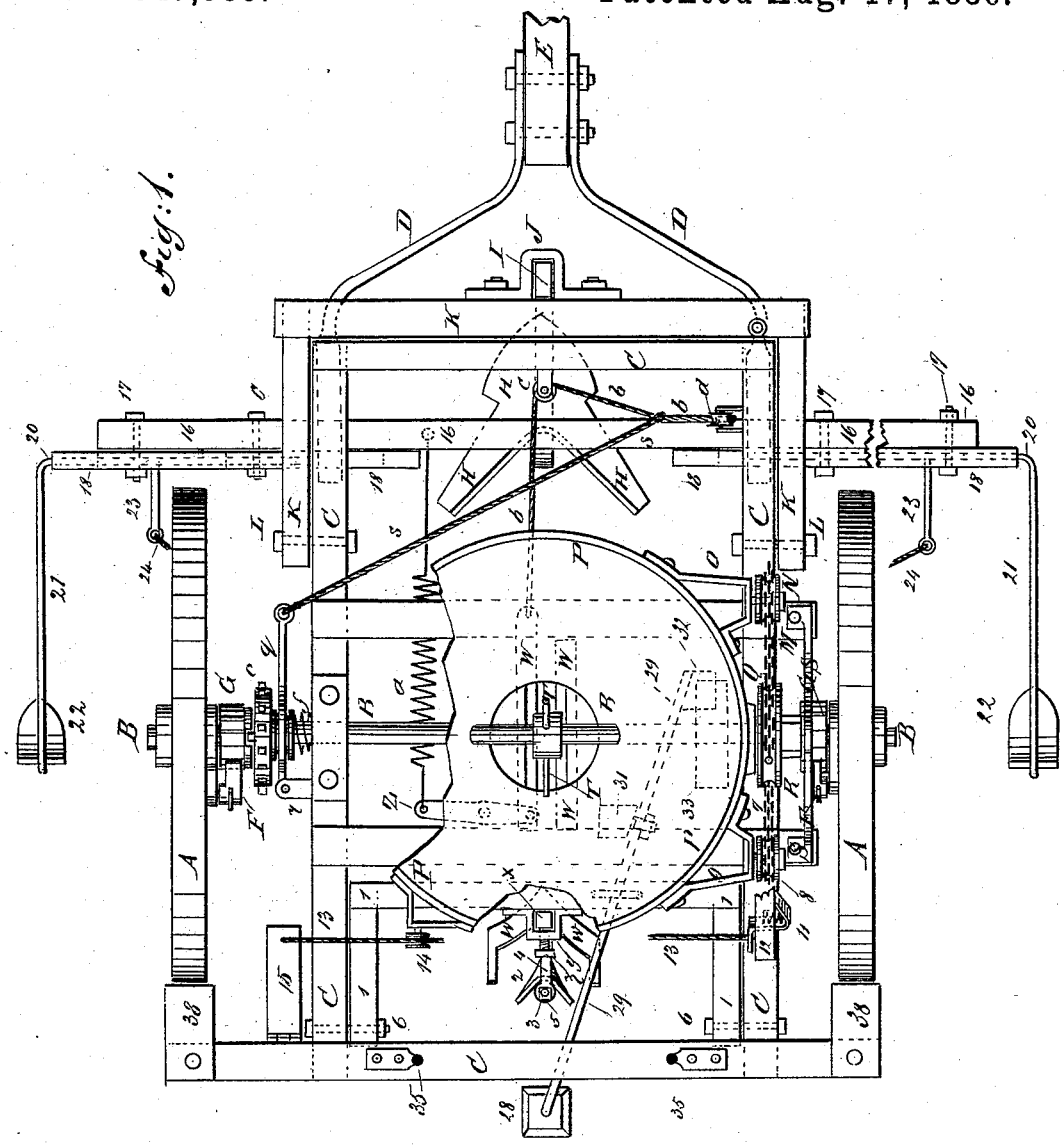
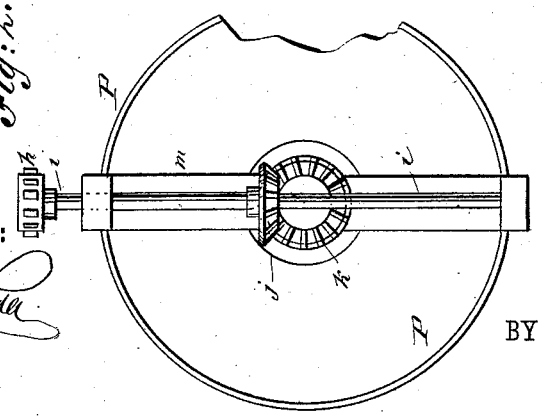
WITNESSES:
Chas. Nider
C. Sedgwick
INVENTOR:
J. Van Siclen
BY Munn & Co.
ATTORNEYS.
N. PETERS, Photo-Lithographer, Washington, D. C.

(No Model.)  J. VAN SICLEN.  3 Sheets—Sheet 2.
FERTILIZER DISTRIBUTER.
No. 347,535. Patented Aug. 17, 1886.
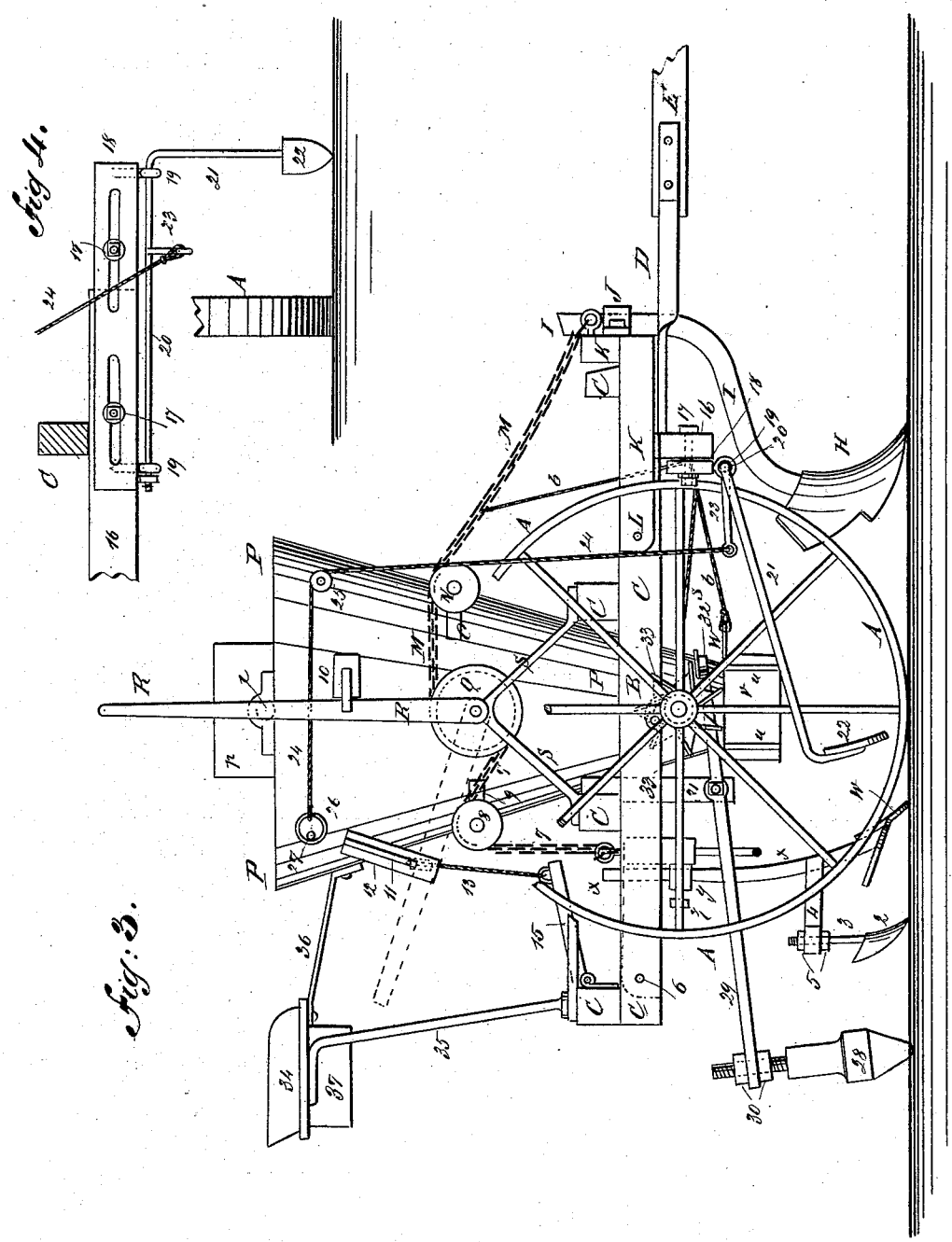
WITNESSES:
INVENTOR:
J. Van Siclen
BY Munn & Co.
ATTORNEYS.

(No Model.)  J. VAN SICLEN.  3 Sheets—Sheet 3.
FERTILIZER DISTRIBUTER.
No. 347,535.  Patented Aug. 17, 1886.
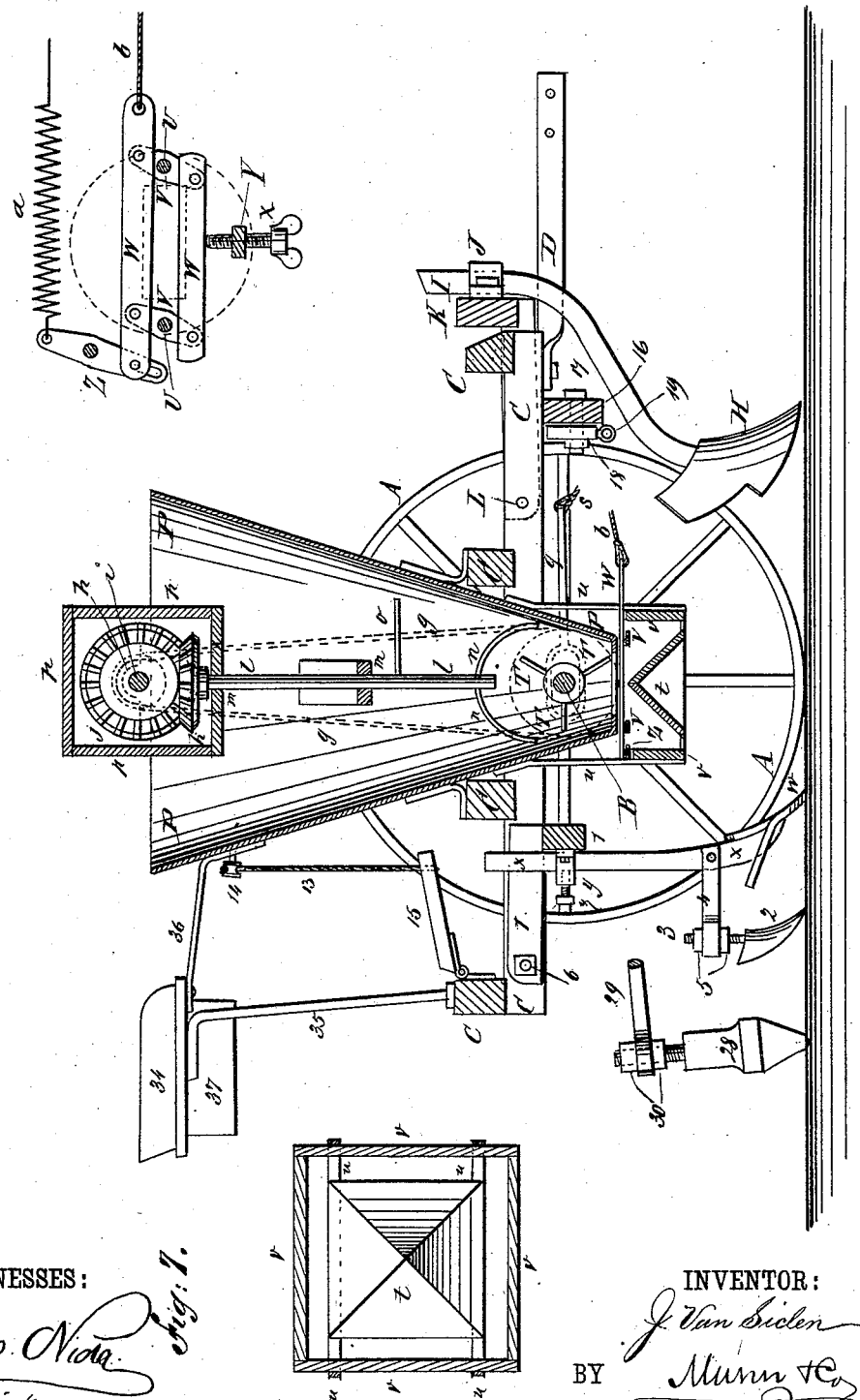
WITNESSES:  
Chas. Nida  
C. Sedgwick
INVENTOR:  
J. Van Siclen  
BY Munn & Co  
ATTORNEYS.

UNITED STATES PATENT OFFICE.

JAMES VAN SICLEN, OF JAMAICA, NEW YORK.

FERTILIZER-DISTRIBUTER.

SPECIFICATION forming part of Letters Patent No. 347,535, dated August 17, 1886.

Application filed April 27, 1886. Serial No. 200,287. (No model.)

*To all whom it may concern:*

Be it known that I, JAMES VAN SICLEN, of Jamaica, in the county of Queens and State of New York, have invented a new and useful Improvement in Fertilizer - Distributers, of which the following is a full, clear, and exact description.

Reference is to be had to the accompanying drawings, forming a part of this specification, in which similar letters of reference indicate corresponding parts in all the figures.

Figure 1 is a plan view of my improved machine, parts being broken away. Fig. 2 is a plan view showing the top of the hopper and the mechanism for operating the stirrer. Fig. 3 is a side elevation of the machine, parts being broken away. Fig. 4 is a rear elevation of a part of the marking mechanism. Fig. 5 is a sectional side elevation of the machine. Fig. 6 is a plan view of the discharge-regulating mechanism, its supports being shown in section. Fig. 7 is a plan view of the divider, its supporting-bars and casing being shown in section.

The object of this invention is to provide fertilizer-distributers constructed in such a manner that the discharge-opening can be closed, the stirring mechanism thrown out of gear, and the plows raised from the ground by operating a single lever, and can all be returned to working positions by operating a treadle, which can be readily adjusted to distribute more or less fertilizer to the acre, and which shall be reliable in operation.

The invention consists in the construction and combination of various parts of the machine, as will be hereinafter fully described.

A represents the drive-wheels, the axle B of which revolves in bearings attached to the side bars of the main frame C. To the forward corners of the frame C are rigidly attached the hounds D, the forward ends of which are attached to the rear end of the tongue E, so that the said tongue will hold the said frame from rocking upon the axle B. To the wheels A are pivoted pawls F, which engage with ratchet-wheels G, attached to the axle B, so that the said wheels in their forward movement will carry the said axle with them, but can be turned back without moving the said axle.

A furrow is opened to receive the fertilizer by a double-mold-board plow, H, the standard I of which is bent forward and upward, and is secured by a clamp, J, or other suitable means, to the center of the forward side of the cross-bar of the U-shaped frame K. The ends of the side bars of the frame K are hinged by bolts L to the side bars of the main frame C. To one corner of the hinged frame K is attached the end of a chain, M, which passes over a pulley, N, pivoted to a bracket, O, attached to the hopper P. The chain M passes over and is attached to a pulley, Q, attached to a lever, R, pivoted in line with the center of the said pulley Q to a support, S, attached to the frame C, so that by swinging the lever R to the rearward the furrow-opening plow H will be raised from the ground. The hopper P is made funnel-shaped, and has a rectangular opening in its bottom, through which the fertilizer is pushed by the radial fingers T, attached to the axle B, or to a hub attached to the said axle. The axle B passes through the sides of the hopper P at such a distance above its bottom that the end parts of the fingers T will push the fertilizer through the discharge-opening in the said bottom.

To bolts or screws U, attached to the hopper-bottom, in front and rear of the discharge-opening, and in line with the central line of the said opening, are pivoted the centers of two equal-armed levers, V, to the ends of which are pivoted two parallel plates, W, so that the size of the discharge-opening can be regulated by limiting the distance apart to which the said parallel plates W can be separated. The distance apart to which the plates W can be separated is limited by a hand-screw, X, the forward end of which rests against the outer edge of one of the plates W, and which passes through a screw-hole in a hanger, Y, attached to the bottom of the hopper P. To the rear end of the other plate W is pivoted the inner end of a lever, Z, which is pivoted to the frame C, and to its outer end is attached the rear end of the spiral spring *a*. The forward end of the spring *a* is attached to a cross-bar of the frame C, so that the tension of the spring *a* will hold the plates W at the distance apart fixed by the hand-screw X. To the forward end of the plate W connected with the lever Z is attached the end of a cord or chain, *b*, which passes around a pulley, *c*, pivoted to a support attached to the front cross-bar of the frame C.

From the pulley $c$ the cord or chain $b$ passes around a pulley, $d$, pivoted to a support attached to the forward part of a side bar of the frame C. The end of the cord $b$ is attached to the chain M, so that when the lever R is operated to raise the furrow-opening plow from the ground the same movement of the said lever will close the plates W and thus stop the discharge of the fertilizer. Upon the inner end of the hub of one of the ratchet-wheels G are formed clutch-teeth, with which engage clutch-teeth formed upon the outer end of the hub of the chain-wheel $e$, placed loose upon the axle B, and held outward against the said ratchet-wheel G by a spiral spring, $f$, placed upon the axle B and interposed between the said chain-wheel $e$ and the bearing of the said axle. Around the chain-wheel $e$ passes an endless chain, $g$, which also passes around a chain-wheel, $h$, attached to the end of the shaft $i$, journaled in bearings attached to the top of the hopper P. To the middle part of the shaft $i$ is attached a beveled gear-wheel, $j$, the teeth of which mesh into the teeth of the beveled gear-wheel $k$, attached to the upper end of the vertical shaft $l$. The shaft $l$ revolves in bearings in cross-bars $m$, attached to the hopper P, and to the opposite sides of its lower end are attached outwardly and downwardly curved arms $n$, which, as the said shaft $l$ revolves, keep the fertilizer in the lower part of the hopper P stirred up, so that it will be fed out evenly by the fingers T. To the shaft $l$, at a little distance from its lower end, are attached one or more radial arms, $o$, to keep the fertilizer in the middle part of the hopper P stirred up, so that it will pass down freely into the lower part of the said hopper.

The gear-wheels $j k$ are inclosed by a casing, $p$, to prevent them from becoming clogged by the fertilizer.

Around the inner end of the hub of the chain-wheel $e$ is formed an annular groove to receive the slotted or forked lever $q$, the rear end of which is pivoted to a support, $r$, attached to the frame C. To the forward end of the lever $q$ is attached the end of a cord or chain, $s$, which crosses the forward end of the frame C diagonally, and is attached at its other end to the cord $b$, between the pulleys $c d$, so that when the lever R is operated to raise the furrow-opening plow from the ground and close the discharge-opening of the hopper the same movement of the said lever will throw the chain-wheel $e$ out of gear, and thus stop the movement of the stirrer.

As the fertilizer falls through the discharge-opening in the bottom of the hopper P, it falls upon a pyramid-shaped divider, $t$, by which it is divided or separated to prevent it from falling to the ground in bunches. The divider $t$ is attached to U-shaped bars $u$, the arms of which are attached to the sides of the hopper P. The divider $t$ is surrounded by a casing, $v$, to prevent the fertilizer from being too widely scattered by the said divider $t$, and which is attached to and supported by the U-shaped bars $u$. The fertilizer is mixed with the soil in the bottom of the furrow by the plow $w$, which is made with a wing upon each side projecting outward, and inclined to the rearward, as shown in Figs. 1, 3, and 5, so that the said soil and fertilizer will be thoroughly mixed as they pass over the said wings. The mixing-plow $w$ is attached to the lower end of the standard $x$, the upper end of which is secured by a keeper, $y$, and set-screw $z$, or other suitable means, to the cross-bar of the U-shaped frame 1, so that the said mixing-plow can be readily adjusted to work at any desired depth in the ground.

A channel is opened in the mixed soil and fertilizer to receive seed by the small double-mold-board plow 2, the standard 3 of which is made short, passes through a hole in the rear end of the arm 4, and has a screw-thread formed upon it to receive the nuts 5, placed one above and the other below the said arm 4, so that the depth to which the seed-receiving channel is opened can be regulated by adjusting the said nuts 5. The forward end of the arm 4 is bolted to the lower part of the standard $x$, so that the plow 2 will be raised and lowered by and with the mixing-plow $w$.

The rear ends of the side bars of the U-shaped frame 1 are hinged to the side bars of the frame C by bolts 6. To a corner of the frame 1 is attached the lower end of a chain, 7, which passes over a pulley, 8, pivoted to a bracket, 9, attached to the hopper P, and then passes around the lower part of and is attached to the pulley Q, so that when the lever R is operated to raise the furrow-opening plow H from the ground, close the discharge-opening of the hopper P, and throw the stirrer mechanism out of gear, the same movement of the said lever R will raise the plows $w^2$ away from the ground.

The forward movement of the lever R is limited by a stop, 10, attached to the side of the hopper P. As the lever R is moved to the rearward, it presses inward and passes the spring-catch 11, attached to the bar 12, secured to the hopper P. As the lever R passes the spring-catch 11, the said spring-catch springs outward, and thus prevents the said lever from moving forward until the said spring-catch is drawn inward. To the spring-catch 11 is attached the end of a cord or chain, 13, which passes over a pulley, 14, pivoted to a bracket attached to the hopper P. The other end of the cord or chain 13 is secured to the forward end of the treadle 15, the rear end of which is hinged to the rear cross-bar of the frame C. With this construction, when the machine is in a position to work, the driver, by operating the treadle 15 with his foot, can draw inward the spring-catch 11 and release the lever R, when the various operating parts of the machine return to a working position.

To the forward part of the side bars of the frame C is attached a cross-bar, 16, the ends of which project beyond the wheels A. To the end parts of the cross-bar 16 are secured by bolts 17 the extension-bars 18. The bolts 17 pass through slots in the bar 16 and holes or slots in the extension-bars 18, so that the said bars 18 can be extended more or less as the desired distance apart of the rows may require.

To the under sides of the extension-bars 18 are secured by eyebolts or staples 19, or other suitable bearings, the shafts 20, upon the outer ends of which are formed, or to them are attached, the standards 21. To the lower ends of the standards 21 are attached small plows 22, to mark the ground for the next row, so that the driver can readily keep the rows parallel. To the rock-shafts 20 are rigidly attached, or upon them are formed, rearwardly-projecting arms 23, to the rear ends of which are attached the ends of cords or chains 24. The cords or chains 24 pass over pulleys 25, pivoted to supports attached to the upper forward parts of the sides of the hopper P, and have rings 26 attached to their rear ends to engage with hooks or pins 27, attached to the upper rear part of the sides of the said hopper P.

When the machine is in use, the markers are used successively, and the one not in use is held away from the ground by hooking its ring 26 over the pin 27. When each marker is in use, its ring 26 is detached from its pin 27.

28 is a conical pointed marker of sufficient size and weight to form holes in the soil of sufficient depth and size to receive the potatoes to be planted. The upper part of the shank of the marker 28 has a screw-thread formed upon it, passes through a hole in the rear end of the lever 29, and has nuts 30 screwed upon it above and below the said lever, so that it can be adjusted to enter the ground to a greater or less depth by adjusting the said nuts 30. The lever 29, at a little distance from its forward end, is pivoted to a hanger, 31, attached to a cross-bar of the frame C, and to the side of its forward end is attached a pin or block, 32, to engage with the cam-wheel 33, attached to the axle B at one side of the hopper P. The cam-wheel 33 is made with such a number of cams as will cause the marker 28 to form holes in the soil at proper distances apart to receive the potatoes.

34 is the driver's seat, which is attached to the upper ends of standards 35, attached at their lower ends to the rear cross-bar of the frame C. The driver's seat 34 is strengthened in place by a brace, 36, attached at its rear end to the said seat and at its forward end to the hopper P. To the seat 34 is attached a box, 37, to receive such tools as may be necessary for adjusting the various parts of the machine.

The ends of the rear cross-bar of the frame C are extended, and to them are attached scrapers 38, to remove any soil that may adhere to the wheels A.

Having thus fully described my invention, what I claim as new, and desire to secure by Letters Patent, is—

1. In a fertilizer-distributer, the combination, with the wheels A, the axle B, the frame C, and the hopper P, of the hinged frame K, the furrow-opening plow H I, the chain M, the guide-pulley N, and the pulley and lever Q R, substantially as herein shown and described, whereby the said furrow-opening plow can be readily raised from the ground, as set forth.

2. In a fertilizer-distributer, the combination, with the hopper-bottom having discharge opening, the frame C, and the chain M, pulley Q, and lever R, for raising the furrow-opening plow, of the two equal-armed levers V, pivoted to the said bottom, the parallel plates W, pivoted to the said levers, the hand-screw X, for limiting the separation of the said plates, the lever Z and spring a, for separating the said plates, and the cord b, connecting the said plates, and the chain M, substantially as herein shown and described, whereby the movement of the said lever to raise the furrow-opening plow from the ground will close the discharge-opening of the hopper, as set forth.

3. In a fertilizer-distributer, the combination, with the wheels A, the axle B, the frame C, the chain-wheel e, driving the stirrer mechanism, the chain M, pulley Q, and lever R, for raising the furrow-opening plow, and the cord b, for closing the discharge-opening, of the lever q and cord s, substantially as herein shown and described, whereby the movement of the said lever to raise the furrow-opening plow and close the discharge-opening will also throw the stirrer mechanism out of gear, as set forth.

4. In a fertilizer-distributer, the combination, with the frame C, the hopper P, and the pulley and lever Q R, for raising the furrow-opening plow, closing the discharge-opening, and throwing the stirrer mechanism out of gear, of the hinged frame 1, the mixing-plow w x, the channel-opening plow 2 3 4, and the chain 7 and pulley 8, substantially as herein shown and described, whereby the movement of the said lever to raise the furrow-opening plow, close the discharge-opening, and throw the stirrer mechanism out of gear, will also raise the mixing-plow and the channel-opening plow from the ground, as set forth.

5. In a fertilizer-distributer, the combination, with the frame C and the hopper P, of the bar 12, the spring-catch 11, the cord 13, and the treadle 15, substantially as herein shown and described, whereby the lever for throwing the working parts out of gear will be caught and held when operated, and can be readily released, as set forth.

6. In a fertilizer-distributer, the combination, with the frame C and the hopper P, of the cross-bar 16, the extension-bars 18, the rock-shafts 20, connected with the said extension-bars, the standards and plows 21 22, the arms 23, rigidly connected with the said shafts, and the cords 24, pulleys 25, pins 27, attached to the said hopper, and the rings 26, attached to the said cords, substantially as herein shown and described, whereby the said markers can be readily adjusted and thrown out of and into a working position, as set forth.

7. In a fertilizer-distributer, the combination, with the frame C, the wheels A, the axle B, and the cam-wheel thereon, of the lever 29, pivoted to the frame and engaging the cam with its forward end, the conical marker 28, having a screw-threaded shank extending through an aperture in the rear end of the lever 29, and the nuts 30 on the said shank rigidly attached to the lever, substantially as set forth.

Witnesses:  JAMES VAN SICLEN.
JAMES T. GRAHAM,
C. SEDGWICK.